(12) United States Patent
Gupta et al.

(10) Patent No.: US 11,216,692 B2
(45) Date of Patent: Jan. 4, 2022

(54) SYSTEMS AND METHODS FOR COUPLED REPRESENTATION USING TRANSFORM LEARNING FOR SOLVING INVERSE PROBLEMS

(71) Applicant: Tata Consultancy Services Limited, Mumbai (IN)

(72) Inventors: Kavya Gupta, Kolkata (IN); Brojeshwar Bhowmick, Kolkata (IN); Angshul Majumdar, New Delhi (IN)

(73) Assignee: Tata Consultancy Services Limited, Mumbai (IN)

( * ) Notice: Subject to any disclaimer, the term of this patent is extended or adjusted under 35 U.S.C. 154(b) by 280 days.

(21) Appl. No.: 16/502,760

(22) Filed: Jul. 3, 2019

(65) Prior Publication Data

US 2020/0012889 A1    Jan. 9, 2020

(30) Foreign Application Priority Data

Jul. 6, 2018  (IN) .............................. 201821025416

(51) Int. Cl.
*G06K 9/62* (2006.01)

(52) U.S. Cl.
CPC ......... *G06K 9/6255* (2013.01); *G06K 9/6245* (2013.01); *G06K 9/6262* (2013.01)

(58) Field of Classification Search
None
See application file for complete search history.

(56) References Cited

U.S. PATENT DOCUMENTS

| 2015/0254810 | A1  | 9/2015  | Heidrich et al. |
| 2015/0287223 | A1* | 10/2015 | Bresler ............. G06T 11/006 382/131 |
| 2016/0012334 | A1* | 1/2016  | Ning ............. G06K 9/00369 706/46 |
| 2017/0213109 | A1* | 7/2017  | Moody ............ H03M 7/3084 |
| 2017/0360377 | A1* | 12/2017 | Rossi ............... A61B 5/364 |

OTHER PUBLICATIONS

Nagpal, S.—"Face Sketch Matching via Coupled Deep Transform Learning"—Oct. 22-29, 2017—IEEE, pp. 5429-5438 (Year: 2017).*
Beckouche, S.—"Astronomical image denoising using dictionary learning"—A&A 556, A132 (2013), pp. 1-14 (Year: 2013).*
Ravishankar, S.—"Learning Sparsifying Transforms"—IEEE 2012, pp. 1-15 (Year: 2012).*

* cited by examiner

*Primary Examiner* — Bernard Krasnic
(74) *Attorney, Agent, or Firm* — Finnegan, Henderson, Farabow, Garrett & Dunner, LLP (57) ABSTRACT

This disclosure relates to systems and methods for solving generic inverse problems by providing a coupled representation architecture using transform learning. Convention solutions are complex, require long training and testing times, reconstruction quality also may not be suitable for all applications. Furthermore, they preclude application to real-time scenarios due to the mentioned inherent lacunae. The methods provided herein require involve very low computational complexity with a need for only three matrix-vector products, and requires very short training and testing times, which makes it applicable for real-time applications. Unlike the conventional learning architectures using inductive approaches, the CASC of the present disclosure can learn directly from the source domain and the number of features in a source domain may not be necessarily equal to the number of features in a target domain.

15 Claims, 4 Drawing Sheets

SYSTEMS AND METHODS FOR COUPLED REPRESENTATION USING TRANSFORM LEARNING FOR SOLVING INVERSE PROBLEMS

PRIORITY CLAIM

This U.S. patent application claims priority under 35 U.S.C. § 119 to: Indian Patent Application No. 201821025416, filed on 6 Jul. 2018. The entire contents of the aforementioned application are incorporated herein by reference.

TECHNICAL FIELD

The disclosure herein generally relates to inverse problems in image processing, and, more particularly, to systems and methods for coupled representation using transform learning for solving inverse problems.

BACKGROUND

Image acquisition has been known to be fraught with several problems that have been traditionally recast as inverse problems. Most notable among the problems include denoising, deblurring and super-resolution. Noise appears in cameras owing to heating of sensors, analog to digital conversion etc. Removal of noise is popularly called denoising. Images can get blurred owing mostly to motion artefacts, due to movement of the camera or the target or both. Deblurring is used for removal of such artifacts. Limitations in packing sensors (low resolution in order to check costs/size) require super-resolving them.

Classical signal processing techniques address some of these problems but are slow and require solving complex optimization problems and therefore preclude their application for real-time problems. Deep learning based techniques known in the art, besides relying on many parameters, involve many layers for data transformation and training is a time consuming activity.

SUMMARY

Embodiments of the present disclosure present technological improvements as solutions to one or more of the above-mentioned technical problems recognized by the inventors in conventional systems.

In an aspect, there is provided a processor implemented method for performing a model driven domain specific search comprising: identifying a source domain comprising one or more corrupted data (y) in a training set; identifying a target domain comprising one or more clean data (x) in the training set; and generating a model for coupled representation learning using equal number of the one or more corrupted data and the one or more clean data, the step of generating a model comprising: learning a source domain transform ($T_S$) and corresponding source domain features ($Z_S$) pertaining to the source domain; learning a target domain transform ($T_T$) and corresponding target domain features ($Z_T$) pertaining to the target domain; and coupling the source domain features ($Z_S$) and the target domain features ($Z_T$) using an objective function serving as a coupling mechanism based on the analysis sparse coding formulation and characterized by a coupling operator (A) such that the source domain features ($Z_S$) are linearly mapped to the target domain features ($Z_T$), wherein the objective function being a non-convex problem is solved using the alternating minimization method by dividing the non-convex problem into a plurality of convex problems, wherein the plurality of convex problems is solved in an alternating manner until the objective function converges to a local minima.

In another aspect, there is provided a system comprising: one or more data storage devices operatively coupled to the one or more processors and configured to store instructions configured for execution by the one or more processors to: identify a source domain comprising one or more corrupted data (y) in a training set; identify a target domain comprising one or more clean data (x) in the training set; and generate a model for coupled representation learning using equal number of the one or more corrupted data and the one or more clean data, wherein the model is generated by: learning a source domain transform ($T_S$) and corresponding source domain features ($Z_S$) pertaining to the source domain; learning a target domain transform ($T_T$) and corresponding target domain features ($Z_T$) pertaining to the target domain; and coupling the source domain features ($Z_S$) and the target domain features ($Z_T$) using an objective function serving as a coupling mechanism based on the analysis sparse coding formulation and characterized by a coupling operator (A) such that the source domain features ($Z_S$) are linearly mapped to the target domain features ($Z_T$), wherein the objective function being a non-convex problem is solved using the alternating minimization method by dividing the non-convex problem into a plurality of convex problems, wherein the plurality of convex problems is solved in an alternating manner until the objective function converges to a local minima.

In yet another aspect, there is provided a computer program product comprising a non-transitory computer readable medium having a computer readable program embodied therein, wherein the computer readable program, when executed on a computing device, causes the computing device to: identify a source domain comprising one or more corrupted data (y) in a training set; identify a target domain comprising one or more clean data (x) in the training set; and generate a model for coupled representation learning using equal number of the one or more corrupted data and the one or more clean data, wherein the model is generated by: learning a source domain transform ($T_S$) and corresponding source domain features ($Z_S$) pertaining to the source domain; learning a target domain transform ($T_T$) and corresponding target domain features ($Z_T$) pertaining to the target domain; and coupling the source domain features ($Z_S$) and the target domain features ($Z_T$) using an objective function serving as a coupling mechanism based on the analysis sparse coding formulation and characterized by a coupling operator (A) such that the source domain features ($Z_S$) are linearly mapped to the target domain features ($Z_T$), wherein the objective function being a non-convex problem is solved using the alternating minimization method by dividing the non-convex problem into a plurality of convex problems, wherein the plurality of convex problems is solved in an alternating manner until the objective function converges to a local minima.

In an embodiment of the present disclosure, wherein the objective function is represented as:

$$\min_{T_M, T_S, Z_M, Z_S, A} \|T_S y - Z_S\|_F^2 + \|T_T x - Z_T\|_F^2 +$$

$$\lambda(\|T_S\|_F^2 + \|T_T\|_F^2 - \log \det T_S - \log \det T_T) +$$

$$\mu \|Z_T - A Z_S\|_F^2 + \lambda_x \|Z_T\|_1 + \lambda_y \|Z_S\|_1.$$

In an embodiment of the present disclosure, wherein the plurality of convex problems are represented as:

P1: $\min_{T_S} \|T_S y - Z_S\|_F^2 + \lambda(\|T_S\|_F^2 - \log \det T_S)$

P2: $\min_{T_T} \|T_T x - Z_T\|_F^2 + \lambda(\|T_T\|_F^2 - \log \det T_T)$

P3: $\min_{Z_S} \|T_S y - Z_S\|_F^2 + \mu \|Z_T - A Z_S\|_F^2 + \lambda_y \|Z_S\|_1$ P4: $\min_{Z_T} \|T_T x - Z_T\|_F^2 + \mu \|Z_T - A Z_S\|_F^2 + \lambda_x \|Z_T\|_1$ P5: $\min_{A} \|Z_T - A Z_S\|_F^2$.

In an embodiment of the present disclosure, the one or more hardware processors are further configured to solve an inverse problem by synthesizing one or more clean data ($x_{test}$) from corresponding one or more corrupted data ($y_{test}$) from a testing set by: receiving the one or more corrupted data ($y_{test}$); obtaining source domain features ($z_S$) based on the one or more corrupted data ($y_{test}$) and the source domain transform ($T_S$); obtaining target domain features ($\hat{z}_T$) based on the coupling operator (A) and the source domain features ($z_S$); and synthesizing the one or more clean data ($x_{test}$) based on the target domain transform $T_T$ and the target domain features ($\hat{z}_T$).

In an embodiment of the present disclosure, obtaining features ($z_S$) of the one or more corrupted data is represented as $z_S \leftarrow T_S y$.

In an embodiment of the present disclosure, obtaining features ($\hat{z}_T$) of the target domain is represented as $\hat{z}_T = A z_S$.

In an embodiment of the present disclosure, synthesizing the one or more clean data (x) of the target domain is represented as a pseudo inverse form $T_T x = \hat{z}_T$.

In an embodiment of the present disclosure, the number of features of the source domain is less than, more than or equal to the number of features in the target domain.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

COMPLETE DESCRIPTION OF EMBODIMENTS

These days, on-chip processing is required for various modern day tasks like autonomous driving, unmanned aerial vehicles, etc. In such cases, inverse problems such as denoising, deblurring, super-resolution and reconstruction arise. However, existing signal processing techniques are not powerful enough to be executed on the fly. Also, edge computing (data processing as close to the source as possible) is the need of the hour. Although deep learning techniques have addressed some of these issues, complexity of execution, number of parameters involved, and long training time continue to pose some of the challenges in applying the deep learning techniques to real-time applications. Systems and methods of the present disclosure, particularly address the inverse problems mentioned herein above and enable application to real-time scenarios. The systems and methods of the present disclosure are based on a coupled representation learning approach, wherein a basis or transform (and corresponding coefficients or features) are learnt for a source domain and a target domain such that the features from one domain can be linearly mapped to the other. The transforms provide a representation for a corresponding domain. Unlike prior art, in accordance with the present disclosure, the representation in the source domain may constitute lower dimensional measurements compared to the target domain. There is a learned coupling map from the source or measurement domain to the target or signal domain.

In the context of the present disclosure, the expressions 'source domain' and 'measurement domain' may be used interchangeably. Likewise, 'target domain' and 'signal domain' may be used interchangeably. The expressions 'basis' or 'transform' may be used interchangeably. Furthermore, 'features' or 'coefficients' may be used interchangeably.

Figure 1:
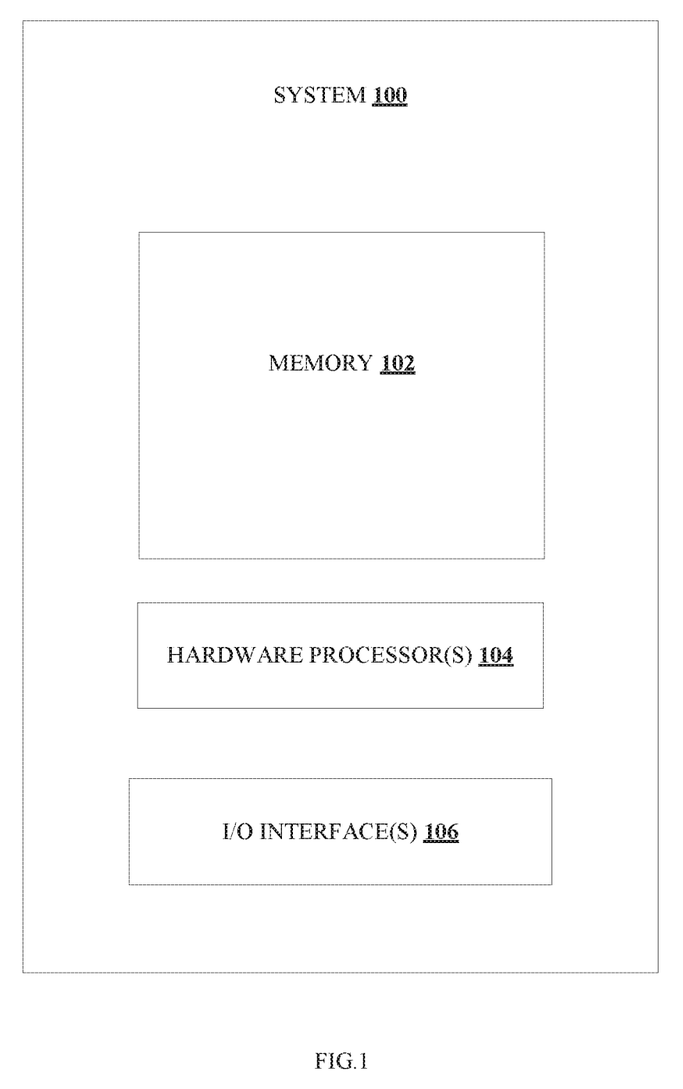
FIG. 1 illustrates an exemplary block diagram of a system having coupled representation using transform learning for solving inverse problems, in accordance with an embodiment of the present disclosure.
Figure 2A:
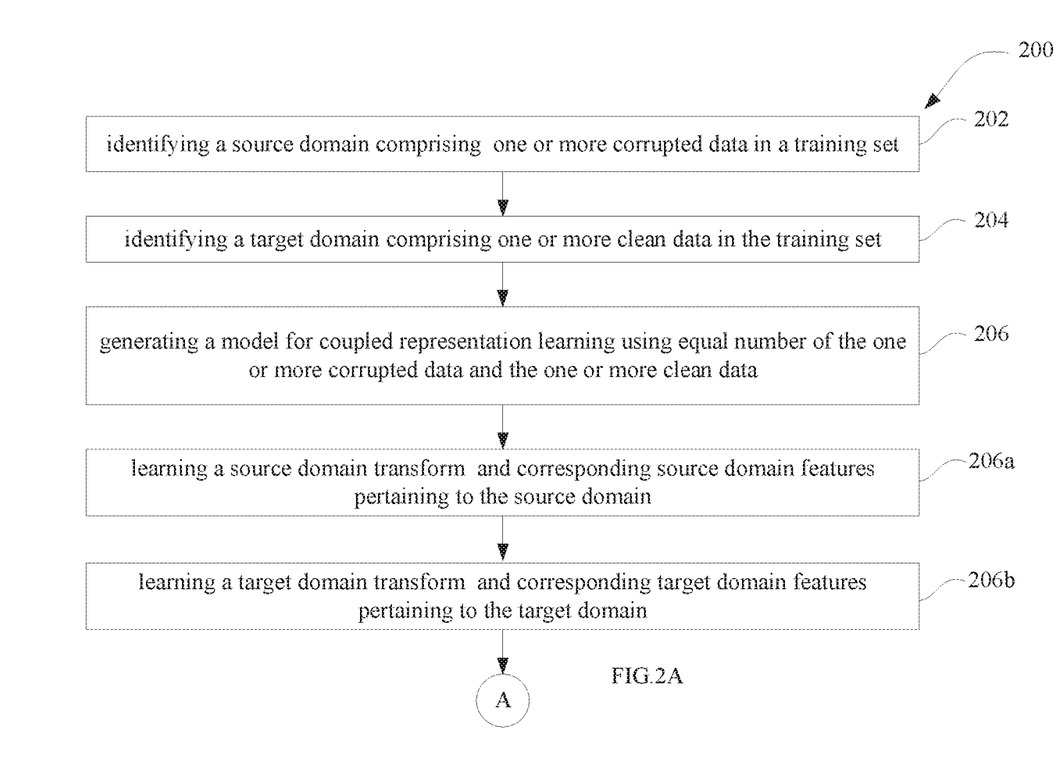
FIG. 2A through FIG. 2B illustrate exemplary flow diagrams for a computer implemented method for providing coupled representation using transform learning for solving inverse problems, in accordance with an embodiment of the present disclosure.
Figure 2B:
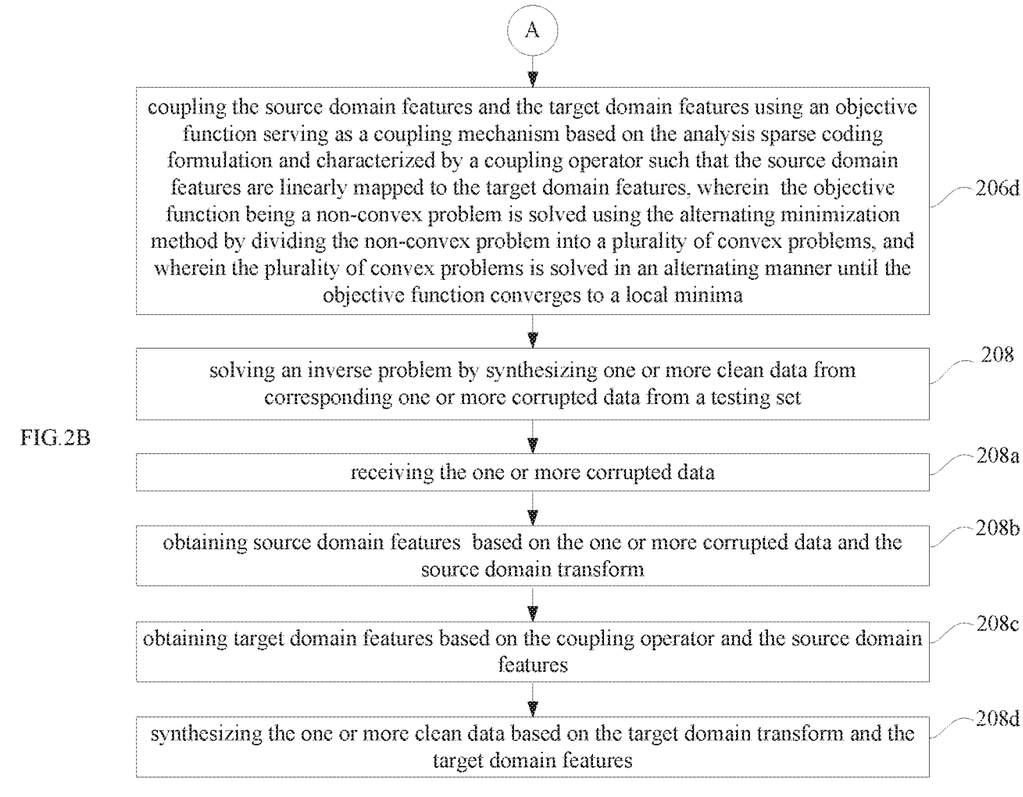
Figure 3:
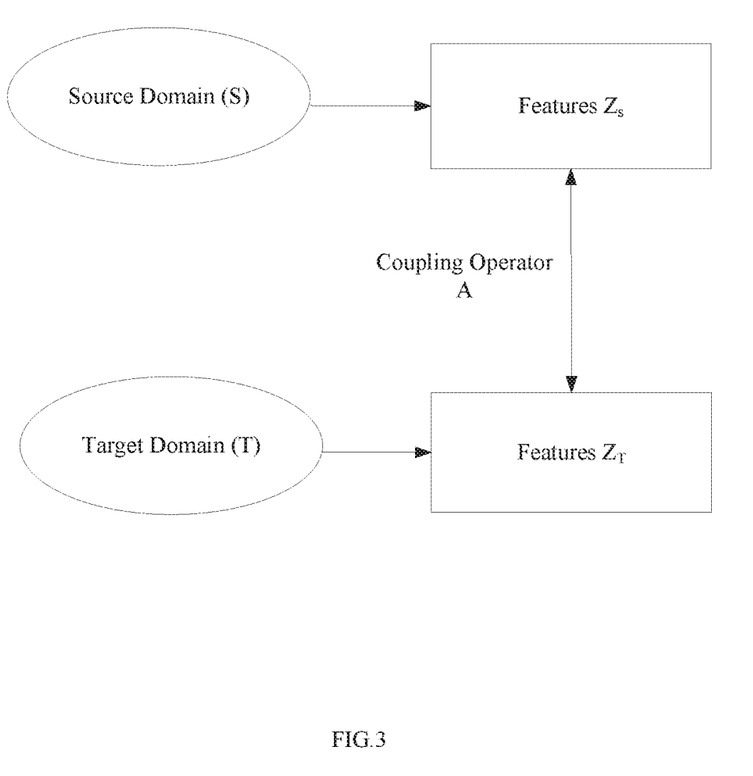
FIG. 3 provides a schematic representation of coupled representation learning, in accordance with an embodiment of the present disclosure.

Referring now to the drawings, and more particularly to FIG. 1 through FIG. 3 where similar reference characters denote corresponding features consistently throughout the figures, there are shown preferred embodiments and these embodiments are described in the context of the following exemplary system and/or method.

FIG. 1 illustrates an exemplary block diagram of a system 100 having coupled representation using transform learning for solving inverse problems in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2A through FIG. 2B illustrate exemplary flow diagrams for a computer implemented method 200 for providing coupled representation using transform learning for solving inverse problems, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Image restoration problems may be expressed in a generic way as a linear inverse problem of the following form:

$$y = Ax + n \rightarrow \quad (1)$$

wherein y is acquired (corrupted) data, x is clean data (to be estimated), A is a coupling operator and n is noise. For denoising, A is identity; for deblurring, A is a convolution with the blurring kernel, for super-resolution A is a sampling operator and for reconstruction, A is a compression matrix.

In accordance with the present disclosure, coupled representation using transform learning is used for solving generic inverse problems of the form expressed in equation (1). Corrupted data y in the form of a corrupted image or say a corrupted biomedical signal may be treated as a source domain and clean data x in the form of a clean image or clean biomedical signal may be treated as a target domain. In accordance with the present disclosure, a coupled representation learning may be used to learn the mapping from the source or measurement domain to the signal or target domain. FIG. 3 provides a schematic representation of coupled representation learning further explained below in accordance with an embodiment of the present disclosure.

Conventionally, in accordance with the signal processing approach, the problem of equation (1) is solved via $l_1$ minimization method, a non-linear inversion operation, wherein the non-linearity is verified by analyzing the vanilla Iterative Soft Thresholding Algorithm (ISTA). It has two steps in each iteration as given below:

$$b = \alpha_{k-1} + \sigma\phi^T A^T (Y - A\phi\alpha_{K-1}) \rightarrow \quad (2)$$

$$\alpha_k = \sin(b)\max\left(0, |b| - \frac{\lambda\sigma}{2}\right) \rightarrow \quad (3)$$

wherein $\sigma$ is the inverse of the maximum Eigen value of $A^T A$.

The first step represented by equation (2) is a gradient descent step, a linear operation. The second step represented by equation (3) involves thresholding and hence is a non-linear operation making the overall algorithm ($l_1$ minimization) a non-linear inversion operation. Other greedy approaches, such as Matching Pursuit, known in the art, are also nonlinear. They either have a sorting step or a thresholding step, making the overall algorithm non-linear.

Instead of assuming that sparsity basis $\Phi$ is known, as in the case with the signal processing approaches, the neural network based methods known in the art have shown that non-linear relationships can be 'learnt' from data Coupled representation learning is not a neural network but can 'learn' non-linear relationships. Dictionary learning and Autoencoder are non-linear in nature. For the later, the non-linearity is explicit in the form of activation functions. For dictionary learning, the non-linearity is implicit, arising from the bi-linearity of the formulation. Such implicit non-linearity has been used in the past to build deep dictionary learning networks. As in neural networks, such non-linearity help coupled representation learning to learn arbitrary relationships from data.

Dictionary learning is a synthesis formulation; sometimes referred as synthesis sparse coding. Transform learning used in the present disclosure is an analysis equivalent of dictionary learning. In analysis sparse coding, an analysis basis operates on the data to generate coefficients (features). Mathematically this may be expressed as: T=XZ where T is the analysis basis or transform, X is the data and Z the corresponding coefficient. The following formulation was disclosed in "Learning Sparsifying Transforms," by S. Ravishankar et al. in the IEEE Transactions on Signal Processing vol. 61.

$$_{T,Z}^{min} \|TX - Z\|_F^2 + \lambda(\|T\|_F^2 - \log \det T) + \mu \|Z\|_1 \rightarrow \quad (4)$$

The factor log det T imposes a full rank on the learned basis; this prevents the degenerate solution (T=0, Z=0). The additional penalty $\|T\|_F^2$ is to balance scale; without this log det T may keep on increasing producing degenerate results in the other extreme.

An alternating minimization approach was also disclosed by S. Ravishankar et al. as follows:

$$Z \leftarrow {_Z^{min}} \|TX - Z\|_F^2 + \mu \|Z\|_1 \rightarrow \quad (5)$$

$$T \leftarrow {_T^{min}} \|TX - Z\|_F^2 + \lambda\epsilon(\|T\|_F^2 - \log \det T) \rightarrow \quad (6)$$

Updating the coefficients (5) via a step of soft thresholding. This is expressed as, $$Z \leftarrow \text{signum}(TX) \odot \max(0, \text{abs}(TX) - \mu) \rightarrow \quad (7)$$

where $\odot$ indicates element-wise product.

Solution to equation (6) has a closed form as shown below.

$$XX^T + \lambda\epsilon I = LL^T \rightarrow \quad (8)$$

$$L^{-1}XZ^T = USV^T \rightarrow \quad (9)$$

$$T = 0.5V(S + (S^2 + 2\lambda I)^{1/2})U^T L^{-1} \rightarrow \quad (10)$$

The present disclosure provides a coupled representation learning formulation that can be used for solving generic inverse problems. In an embodiment of the present disclosure, the one or more processors 104 are configured to identify, at step 202, a source domain that comprises one or more corrupted data (y) in a training set and further identify, at step 204, a target domain that comprises one or more clean data (x) in the training set.

In an embodiment of the present disclosure, the one or more processors 104 are configured to generate a model for coupled representation learning using equal number of the one or more corrupted data and the one or more clean data, at step 206. In an embodiment, firstly a source domain transform ($T_S$) and corresponding source domain features ($Z_S$) pertaining to the source domain are learnt at step 206a. Likewise, a target domain transform ($T_T$) and corresponding target domain features ($Z_T$) pertaining to the target domain are learnt. In accordance with the present disclosure, the number of features of the source domain may not be equal to the number of features in the target domain. Particularly, the source domain may constitute lower dimensional measurements in comparison to the target domain unlike conventional approaches wherein they have to be equal.

The source domain features ($Z_S$) and the target domain features ($Z_T$) are then coupled at step 206c using an objective function serving as a coupling mechanism based on the analysis sparse coding formulation and characterized by a coupling operator (A) such that the source domain features ($Z_S$) are linearly mapped to the target domain features ($Z_T$).

In an embodiment of the present disclosure, the objective function being a non-convex problem is solved using the alternating minimization method by dividing the non-convex problem into a plurality of convex problems, and wherein the plurality of convex problems is solved in an alternating manner until the objective function converges to a local minima. It may be noted that conventionally, multi-optimization problems are solved greedily.

In an embodiment, the objection function may be represented as:

$$\min_{T_M, T_S, Z_M, Z_S, A} \|T_S y - Z_S\|_F^2 + \|T_T x - Z_T\|_F^2 + \quad (11)$$
$$\lambda(\|T_S\|_F^2 + \|T_T\|_F^2 - \log \det T_S - \log \det T_T) +$$
$$\mu\|Z_T - A Z_S\|_F^2 + \lambda_x\|Z_T\|_1 + \lambda_y\|Z_S\|_1 \rightarrow$$

where y represents corrupted data in the training set stacked as columns and x represent corresponding clean data In an embodiment, the plurality of convex problems may be represented as:

P1: $\min_{T_S} \|T_S y - Z_S\|_F^2 + \lambda(\|T_S\|_F^2 - \log \det T_S) \rightarrow$ (12)

P2: $\min_{T_T} \|T_T x - Z_T\|_F^2 + \lambda(\|T_T\|_F^2 - \log \det T_T) \rightarrow$ (13)

P3: $\min_{Z_S} \|T_S y - Z_S\|_F^2 + \mu\|Z_T - A Z_S\|_F^2 + \lambda_y\|Z_S\|_1 \rightarrow$ (14)

P4: $\min_{Z_T} \|T_T x - Z_T\|_F^2 + \mu\|Z_T - A Z_S\|_F^2 + \lambda_x\|Z_T\|_1 \rightarrow$ (15)

P5: $\min_A \|Z_T - A Z_S\|_F^2 \rightarrow$ (16)

The sub-problems P1 and P2 are similar to equation (6) with their closed forms discussed above.

The sub-problems P3 and P4 are standard $l_1$ minimization problems where the ISTA algorithm may be used.

The sub-problem P5 has a closed form solution (Moore-Penrose pseudo inverse).

Thus by solving equations (12) through (15), optimal solutions for the transforms, features and the coupling operator ($T_S$, $T_T$, $Z_S$, $Z_T$ and A) are obtained using the model trained on the training set.

In an embodiment, the one or more processors (104) are further configured to solve an inverse problem, at step 208, by synthesizing one or more clean data ($x_{test}$) from corresponding one or more corrupted data ($y_{test}$) from a testing set. It may be understood to one skilled in the art that the testing set is discrete from the training set and hence comprises unknown data. Firstly the one or more corrupted data ($y_{test}$) may be received at step 208a. Source domain features ($z_S$) are then obtained at step 208b based on the one or more corrupted data ($y_{test}$) and the source domain transform ($T_S$) from the training phase. Accordingly, target domain features ($\hat{z}_T$) are also obtained at step 208c based on the coupling operator (A) and the source domain features ($z_S$) from the training phase. The one or more clean data ($x_{test}$) may then be synthesized, at step 208d, based on the target domain transform $T_T$ from the training phase and the target domain features ($\hat{z}_T$).

In an embodiment the step of obtaining features ($z_S$) of the one or more corrupted data is represented as $z_S \leftarrow T_S y \rightarrow (17)$.

In an embodiment the step of obtaining features ($\hat{z}_T$) of the target domain is represented as $\hat{z}_T = A z_S \rightarrow (18)$.

In an embodiment, the step of synthesizing the one or more clean data (x) of the target domain is represented as a pseudo inverse form $T_T x = \hat{z}_T \rightarrow (19)$.

Thus in accordance with the present disclosure, only three matrix-vector products viz., $T_S y$, $A z_S$ and $T_T x$ are needed once the model is trained making the method of the present disclosure less complex and having faster execution time as seen from the experimental evaluation provided below. On the other hand, conventional methods depend on several matrix-vector products thereby precluding their use in real-time applications.

EXPERIMENTAL EVALUATION

Systems and methods of the present disclosure referred herein after as Coupled Analysis Sparse Coding learning (CASC) were evaluated for four types of problems: denoising, deblurring, super-resolution and compressed sensing (CS) reconstruction. For experimental evaluation of denoising, deblurring and super-resolution the protocol outlined in "Deep Networks for Image Super-Resolution with Sparse Prior," by Z. Wang et al. at the 2015 IEEE International Conference on Computer Vision (ICCV), Santiago was carried out and for CS reconstruction the protocol in "ReconNet: Non-Iterative Reconstruction of Images from Compressively Sensed Measurements," by K. Kulkarni e al. at the 2016 IEEE Conference on Computer Vision and Pattern Recognition (CVPR), Las Vegas was carried out. The training set consists of 91 images for all the problems. For first three problems, the testing set comprises Set5 of 5 images and Set14 of 14 images, for the CS reconstruction problem the testing set consists of 11 standard images.

Denoising: For denoising, the Coupled Analysis Sparse Coding learning (CASC) of the present disclosure was compared with the Coupled Autoencoder (CAE), the Coupled Dictionary Learning (CDL) and the Vectorized Convolutional Neural Network (VCNN). For denoising grayscale of all 91 images was obtained and each image was divided into overlapping patches of size 20×20, the images were corrupted with additive Gaussian noise with zero mean and 0.1 standard deviation. The patches from the clean images were fed as input of the target domain and corresponding source domain was obtained from the 20×20 proposed patches of the noisy images. There are four parameters to be tuned in the CASC of the present disclosure viz., $\lambda$, $\eta$, $\lambda_x$, $\lambda_y$. They were trained on a separate validation set via grid search. The final values used are $\lambda=0.1$, $\eta=1$, while $\lambda_x$ and $\lambda_y$ were set to zero. The transforms for the source and the target domain were perfectly determined. The iterations were run till the objective function converged to local minima. By convergence, it is meant that the value of the objective function does not change much in successive iterations. The results for denoising are shown in Table I.

TABLE I

Denoising Results

| | PSNR | | | | | SSIM | | | | |
|---|---|---|---|---|---|---|---|---|---|---|
| Images | Noisy | CDL | VCNN | CAE | CASC | Noisy | CDL | VCNN | CAE | CASC |
| Set 14 | | | | | | | | | | |
| baboon | 20.14 | 21.82 | 23.93 | 23.17 | 23.15 | 0.54 | 0.50 | 0.68 | 0.62 | 0.62 |
| barbara | 20.12 | 24.31 | 25.57 | 25.42 | 25.36 | 0.40 | 0.62 | 0.65 | 0.66 | 0.66 |
| bridge | 20.15 | 23.80 | 25.07 | 24.90 | 24.84 | 0.50 | 0.59 | 0.71 | 0.70 | 0.69 |
| coastguard | 20.15 | 24.81 | 26.32 | 25.78 | 25.72 | 0.40 | 0.55 | 0.68 | 0.66 | 0.66 |
| comic | 20.28 | 22.06 | 24.49 | 23.72 | 23.74 | 0.59 | 0.67 | 0.77 | 0.76 | 0.76 |
| face | 20.79 | 27.86 | 27.87 | 28.04 | 27.96 | 0.27 | 0.60 | 0.62 | 0.61 | 0.61 |
| flower | 20.33 | 25.21 | 26.30 | 26.53 | 26.42 | 0.40 | 0.68 | 0.68 | 0.71 | 0.70 |
| foreman | 20.54 | 26.46 | 27.19 | 27.20 | 27.07 | 0.29 | 0.60 | 0.65 | 0.68 | 0.67 |
| lena | 20.07 | 27.03 | 26.96 | 27.08 | 27.03 | 0.27 | 0.61 | 0.59 | 0.63 | 0.62 |
| man | 20.48 | 24.73 | 25.96 | 25.37 | 25.35 | 0.40 | 0.59 | 0.66 | 0.64 | 0.64 |
| monarch | 20.05 | 26.48 | 26.73 | 27.06 | 26.94 | 0.28 | 0.68 | 0.59 | 0.66 | 0.65 |
| pepper | 20.17 | 27.34 | 27.12 | 27.23 | 27.15 | 0.26 | 0.62 | 0.58 | 0.62 | 0.62 |
| ppt3 | 21.54 | 23.00 | 27.03 | 24.26 | 24.27 | 0.38 | 0.56 | 0.77 | 0.71 | 0.70 |
| zebra | 20.31 | 24.50 | 26.12 | 25.91 | 25.87 | 0.46 | 0.66 | 0.72 | 0.74 | 0.74 |
| average | 20.37 | 24.96 | 26.19 | 25.84 | 25.78 | 0.39 | 0.61 | 0.67 | 0.67 | 0.67 |
| Set 5 | | | | | | | | | | |
| baby | 20.42 | 27.28 | 27.69 | 27.85 | 27.75 | 0.27 | 0.60 | 0.65 | 0.66 | 0.66 |
| bird | 20.41 | 27.38 | 27.23 | 27.10 | 27.03 | 0.32 | 0.72 | 0.69 | 0.70 | 0.69 |
| butterfly | 20.17 | 23.05 | 25.00 | 24.18 | 24.16 | 0.52 | 0.70 | 0.73 | 0.74 | 0.74 |
| head | 20.75 | 27.66 | 27.93 | 27.82 | 27.75 | 0.27 | 0.60 | 0.62 | 0.60 | 0.60 |
| woman | 20.45 | 25.80 | 26.84 | 27.31 | 27.22 | 0.36 | 0.70 | 0.70 | 0.72 | 0.72 |
| average | 20.44 | 26.23 | 26.94 | 26.85 | 26.79 | 0.35 | 0.66 | 0.68 | 0.69 | 0.68 |

Although VCNN yields slightly better Peak signal-to-noise ratio (PSNR) than the coupled representation learning techniques, in terms of Structural Similarity Index (SSIM), CAE performs better and the CASC of the present disclosure is at par. It is well known in image processing that it is possible to improve PSNR by overtly smoothing the image, but SSIM cannot be tricked by this.

Deblurring: The experimental design for deblurring is same as that mentioned above for denoising. Grayscale images were taken and their motion blurred images were obtained which served as the source domain. Both the images for the source domain and the target domain were divided into overlapping patches of 20×20. The final values used are $\lambda=0.2$, $\eta=1.5$, while $\lambda_x$ and $\lambda_y$ were set to zero and again the transforms of the source and the target domain were perfectly determined. The numerical results for deblurring are shown in Table II.

TABLE II

Deblurring Results

| | PSNR | | | | | SSIM | | | | |
|---|---|---|---|---|---|---|---|---|---|---|
| Images | Blurry | CDL | VCNN | CAE | CASC | Blurry | CDL | VCNN | CAE | CASC |
| Set 14 | | | | | | | | | | |
| baboon | 20.29 | 20.21 | 21.30 | 23.54 | 23.61 | 0.37 | 0.37 | 0.49 | 0.73 | 0.74 |
| barbara | 23.51 | 22.86 | 24.13 | 26.49 | 26.46 | 0.67 | 0.64 | 0.70 | 0.84 | 0.84 |
| bridge | 21.06 | 20.93 | 22.97 | 24.51 | 24.55 | 0.44 | 0.44 | 0.59 | 0.75 | 0.76 |
| coastguard | 22.25 | 22.19 | 23.83 | 25.70 | 25.70 | 0.38 | 0.38 | 0.52 | 0.73 | 0.73 |
| comic | 18.59 | 18.41 | 20.44 | 22.26 | 22.28 | 0.45 | 0.44 | 0.60 | 0.74 | 0.74 |
| face | 28.02 | 27.79 | 29.53 | 31.07 | 31.15 | 0.66 | 0.65 | 0.72 | 0.82 | 0.83 |
| flower | 21.43 | 21.25 | 23.74 | 25.21 | 25.23 | 0.60 | 0.59 | 0.70 | 0.79 | 0.79 |
| foreman | 23.56 | 23.10 | 26.53 | 26.98 | 27.00 | 0.72 | 0.70 | 0.78 | 0.80 | 0.80 |
| lena | 26.62 | 26.36 | 28.81 | 30.22 | 30.25 | 0.76 | 0.75 | 0.80 | 0.87 | 0.87 |
| man | 22.58 | 22.39 | 24.28 | 26.04 | 26.09 | 0.58 | 0.56 | 0.66 | 0.78 | 0.78 |
| monarch | 21.83 | 21.66 | 24.80 | 25.39 | 25.41 | 0.77 | 0.76 | 0.82 | 0.86 | 0.86 |
| pepper | 26.10 | 25.70 | 28.44 | 29.42 | 29.46 | 0.75 | 0.73 | 0.79 | 0.84 | 0.84 |
| ppt3 | 18.97 | 18.69 | 21.49 | 23.00 | 23.00 | 0.72 | 0.70 | 0.77 | 0.78 | 0.78 |
| zebra | 19.61 | 19.40 | 22.52 | 23.45 | 23.45 | 0.48 | 0.47 | 0.67 | 0.77 | 0.77 |
| average | 22.46 | 22.21 | 24.48 | 25.95 | 25.97 | 0.60 | 0.58 | 0.69 | 0.79 | 0.79 |
| Set 5 | | | | | | | | | | |
| baby | 27.17 | 26.71 | 29.58 | 31.06 | 30.69 | 0.78 | 0.76 | 0.85 | 0.90 | 0.89 |
| bird | 25.13 | 24.69 | 28.01 | 29.06 | 28.63 | 0.76 | 0.74 | 0.83 | 0.86 | 0.85 |
| butterfly | 16.32 | 16.12 | 19.51 | 20.04 | 19.88 | 0.48 | 0.47 | 0.62 | 0.66 | 0.65 |
| head | 28.09 | 27.82 | 29.60 | 31.77 | 31.43 | 0.66 | 0.65 | 0.72 | 0.85 | 0.84 |
| woman | 22.32 | 21.98 | 25.36 | 26.80 | 26.50 | 0.73 | 0.71 | 0.8 | 0.84 | 0.82 |
| average | 23.80 | 23.46 | 26.41 | 27.75 | 27.42 | 0.68 | 0.66 | 0.76 | 0.82 | 0.81 |

For deblurring, it is seen that CAE and the CASC of the present disclosure consistently outperform VCNN by a significant margin; note that in image processing anything that improves over 0.5 dB in PSNR and approximately 0.02 in SSIM is considered significant in the sub 30 dB regime.

Super-resolution: For super-resolution, the same techniques as used for denoising and deblurring were used. The only difference is, instead of using VCNN which is for generic image processing, Super-Resolution Convolutional Neural Network (SRCNN) which is a tool tailored for super-resolution was used. Sparse Coding based Network (SCN) has also been compared. For both SRCNN and SCN, the MATLAB testing codes and the pre-trained models made available in the public domain on the same 91 training images were used. The results for PSNR and SSIM only for luminance channels for scaling factor of 2 are shown. For experiments on super-resolution, the luminance channel only was considered and the model was trained on overlapping 10×10 patches. The ground truth luminance channel served as the target domain and the upsampled images served as the source domain. The final values of four parameters used here are $\lambda=0.2$, $\eta=1$, while $\lambda_x$ and $\lambda_y$ were set to zero. The transforms for the source and the target domain were perfectly determined. The iterations were run till the objective function converged to local minima. The numerical results are shown in Table III.

present disclosure and the ones compared against are almost the same (less than 0.2 difference in SSIM).

Reconstruction: For image reconstruction, A is a lower dimensional projection matrix (usually Gaussian, random Bernoulli, restricted Fourier etc.). The task is to recover the image x from the measurements y. Compressed sensing based image reconstruction revolutionized magnetic resonance imaging (MRI) and X-ray computed tomography (CT). It paved the way for faster MRIs and safer CT scans. A recent study showed how CNN can be used for reconstruction. They obtained a noisy version of the image by applying $A^T$ on y. This image was at the input of the CNN, and at the output was the clean image. Thus the CNN 'learnt' to produce a clean version of the image. The CASC of the present disclosure does not need operating y by $A^T$. It can directly learn the inversion. Only the luminance component of the RGB images was used to extract the patches of size 33×33 for training the network. These patches serve as the target domain/ground truth for the architecture. The compressed sensing measurements of the patches were obtained by multiplying with the measurement matrices Φ known in the art. For a given measurement rate, measurement matrix, Φ was first generated by a random Gaussian matrix of appropriate size, followed by orthonormalizing of the rows.

TABLE III

Super-Resolution Results

| | | | | | | | PSNR | | | SSIM | | |
|---|---|---|---|---|---|---|---|---|---|---|---|---|
| Images | Upsampling | CDL | SRCNN | SCN | CAE | CASC | Upsampling | CDL | SRCNN | SCN | CAE | CASC |
| | | | | | Set 14 | | | | | | | |
| baboon | 24.66 | 24.28 | 25.37 | 25.48 | 25.24 | 25.22 | 0.69 | 0.67 | 0.76 | 0.76 | 0.75 | 0.75 |
| barbara | 27.94 | 27.19 | 28.52 | 28.28 | 28.47 | 28.43 | 0.84 | 0.79 | 0.88 | 0.87 | 0.87 | 0.872 |
| bridge | 26.50 | 25.84 | 27.60 | 27.66 | 27.30 | 27.26 | 0.79 | 0.75 | 0.84 | 0.84 | 0.84 | 0.84 |
| coastguard | 29.14 | 28.30 | 30.49 | 30.57 | 30.23 | 30.19 | 0.79 | 0.75 | 0.85 | 0.85 | 0.85 | 0.85 |
| comic | 26.06 | 25.33 | 28.31 | 28.63 | 27.33 | 27.27 | 0.85 | 0.80 | 0.91 | 0.92 | 0.89 | 0.89 |
| face | 34.87 | 33.04 | 35.65 | 35.76 | 35.59 | 35.56 | 0.86 | 0.81 | 0.88 | 0.88 | 0.88 | 0.88 |
| flower | 30.43 | 29.41 | 33.10 | 33.31 | 31.75 | 31.68 | 0.90 | 0.85 | 0.93 | 0.94 | 0.92 | 0.92 |
| foreman | 32.68 | 30.71 | 33.84 | 34.89 | 33.60 | 33.56 | 0.95 | 0.81 | 0.96 | 0.96 | 0.95 | 0.95 |
| lena | 34.75 | 32.47 | 36.55 | 36.57 | 35.96 | 35.91 | 0.91 | 0.82 | 0.93 | 0.93 | 0.93 | 0.92 |
| man | 29.27 | 28.50 | 30.84 | 30.93 | 30.08 | 30.05 | 0.84 | 0.79 | 0.88 | 0.89 | 0.87 | 0.87 |
| monarch | 32.98 | 31.40 | 37.20 | 37.61 | 34.56 | 34.50 | 0.96 | 0.87 | 0.98 | 0.98 | 0.97 | 0.97 |
| pepper | 33.08 | 31.37 | 34.00 | 35.57 | 33.78 | 33.74 | 0.90 | 0.81 | 0.91 | 0.92 | 0.91 | 0.91 |
| ppt3 | 26.92 | 26.08 | 30.44 | 30.40 | 28.30 | 28.26 | 0.95 | 0.78 | 0.97 | 0.98 | 0.95 | 0.95 |
| zebra | 30.68 | 28.74 | 33.32 | 33.42 | 32.45 | 32.34 | 0.91 | 0.83 | 0.94 | 0.94 | 0.94 | 0.93 |
| average | 30.00 | 28.7618 | 31.80 | 32.08 | 31.04 | 31.00 | 0.87 | 0.79 | 0.90 | 0.90 | 0.89 | 0.89 |
| | | | | | Set 5 | | | | | | | |
| baby | 37.12 | 33.47 | 38.36 | 38.37 | 38.33 | 38.28 | 0.95 | 0.84 | 0.96 | 0.96 | 0.96 | 0.96 |
| bird | 36.74 | 33.86 | 40.46 | 40.53 | 38.70 | 38.60 | 0.97 | 0.91 | 0.98 | 0.98 | 0.98 | 0.98 |
| butterfly | 27.46 | 26.80 | 32.14 | 32.51 | 28.95 | 28.88 | 0.91 | 0.84 | 0.96 | 0.96 | 0.93 | 0.92 |
| head | 34.89 | 33.09 | 35.67 | 35.78 | 35.58 | 35.56 | 0.86 | 0.81 | 0.88 | 0.88 | 0.88 | 0.88 |
| woman | 32.16 | 30.19 | 34.93 | 35.27 | 33.67 | 33.60 | 0.95 | 0.86 | 0.97 | 0.97 | 0.96 | 0.96 |
| average | 33.68 | 31.48 | 36.31 | 36.49 | 35.05 | 34.98 | 0.93 | 0.85 | 0.95 | 0.95 | 0.94 | 0.94 |

For super-resolution the SCN yields the best results; it is even marginally better than SRCNN. In terms of PSNR, SRCNN and SCN give the impression that it is much better than CASC (more than 0.5 dB improvement); but it may be noted that this is just an actual improvement in visual quality. As mentioned before, the improvement arises from smoothing of the images. In terms of SSIM (which is a true check for visual quality) the results from the CASC of the This version of patches serves as the corresponding source domain in the architecture. Results of two measurement rates (MR)=0.25 and 0.04 are shown. The patch size is 33×33=1089 pixels per block, the compressed measurements version consists of 272 and 43 pixels per block respectively. The final values used here are $\lambda=0.1$, $\eta=1.0$, while $\lambda_x$ and $\lambda_y$ were set to zero and the transforms for the source domain and the target domain were perfectly determined. The results are shown in Tables IV and V.

TABLE IV

Reconstruction results for 25% under-sampling

| Images | PSNR | | | | SSIM | | | |
|---|---|---|---|---|---|---|---|---|
| | CDL | ReConNet | CAE | CASC | CDL | ReConNet | CAE | CASC |
| Monarch | 17.28 | 18.19 | 19.94 | 19.80 | 0.46 | 0.52 | 0.62 | 0.61 |
| Parrots | 20.17 | 20.37 | 23.08 | 22.84 | 0.56 | 0.63 | 0.76 | 0.75 |
| Barbara | 19.86 | 20.38 | 22.28 | 22.15 | 0.40 | 0.48 | 0.57 | 0.55 |
| boats | 19.63 | 21.35 | 23.08 | 22.90 | 0.44 | 0.53 | 0.62 | 0.60 |
| cameraman | 19.10 | 19.28 | 21.14 | 20.98 | 0.45 | 0.53 | 0.63 | 0.62 |
| fingerprint | 17.12 | 16.93 | 18.47 | 18.32 | 0.33 | 0.42 | 0.49 | 0.47 |
| flinstones | 15.89 | 16.37 | 17.92 | 17.70 | 0.33 | 0.36 | 0.46 | 0.44 |
| foreman | 22.01 | 23.69 | 27.52 | 27.43 | 0.55 | 0.66 | 0.80 | 0.80 |
| house | 21.31 | 22.57 | 24.99 | 24.87 | 0.52 | 0.61 | 0.72 | 0.71 |
| lena | 20.30 | 21.26 | 23.45 | 23.31 | 0.49 | 0.56 | 0.67 | 0.66 |
| peppers | 18.60 | 19.56 | 21.71 | 21.57 | 0.47 | 0.51 | 0.65 | 0.64 |
| average | 19.21 | 19.99 | 22.14 | 21.99 | 0.45 | 0.53 | 0.63 | 0.62 |

TABLE V

Reconstruction results for 4% under-sampling

| Images | PSNR | | | | SSIM | | | |
|---|---|---|---|---|---|---|---|---|
| | CDL | ReConNet | CAE | CASC | CDL | ReConNet | CAE | CASC |
| Monarch | 22.23 | 24.40 | 27.91 | 27.44 | 0.72 | 0.77 | 0.88 | 0.86 |
| Parrots | 24.18 | 25.69 | 29.67 | 29.08 | 0.79 | 0.79 | 0.91 | 0.90 |
| Barbara | 23.25 | 23.25 | 26.91 | 26.22 | 0.62 | 0.68 | 0.83 | 0.81 |
| boats | 25.05 | 27.30 | 30.72 | 30.24 | 0.69 | 0.78 | 0.88 | 0.87 |
| cameraman | 22.46 | 23.18 | 26.64 | 26.05 | 0.68 | 0.70 | 0.83 | 0.80 |
| fingerprint | 21.81 | 25.58 | 29.25 | 29.01 | 0.70 | 0.87 | 0.94 | 0.94 |
| flinstones | 19.60 | 22.60 | 25.92 | 25.62 | 0.55 | 0.67 | 0.81 | 0.79 |
| foreman | 29.28 | 29.47 | 34.59 | 34.10 | 0.83 | 0.82 | 0.92 | 0.92 |
| house | 27.32 | 28.47 | 32.78 | 32.24 | 0.77 | 0.77 | 0.89 | 0.87 |
| lena | 25.09 | 26.54 | 30.33 | 29.82 | 0.74 | 0.77 | 0.89 | 0.88 |
| peppers | 23.53 | 24.77 | 28.72 | 28.27 | 0.72 | 0.72 | 0.86 | 0.84 |
| average | 23.98 | 25.57 | 29.40 | 28.92 | 0.71 | 0.76 | 0.88 | 0.86 |

For ReconNet, a pre-trained model known in the art was used for testing for the two measurement rates. Therein it was shown that ReConNet yields comparable performance. Hence, it is enough to show that there is significant improvement of the CASC of the present disclosure over ReConNet. This indeed is the case; as can be seen from Tables IV and V.

Runtime Comparison: All the experiments were run on an Intel Xeon 3.50 GHz×8 Processor, having 64 GB RAM CPU with 1 Quadro M4000 GPU (though CASC, CDL, and CAE were entirely trained and tested on CPU). For VCNN, the MATLAB code made available in the public domain was used. For, SRCNN (GTX 770) developed using MatConvNet and SCN (GTX 680 GPU) using Caffe, pre-trained models made available in the public domain were used, hence the training times available are presented. Testing time per image for all the techniques were calculated on the Intel Xeon system used for the experiments. The timings for denoising and deblurring are approximately same since they are of the same dimensions. The timings for super-resolution and reconstruction are different. The average run-time per image for each of the techniques compared against is shown in the Table VI below.

TABLE VI

Run-times in seconds

| Technique | Training time | Testing time(s)/image |
|---|---|---|
| VCNN | 6 hours | 5 |
| SRCNN | 3 day | 7 |
| SCN | 1 day | 2 |
| CDL | 4.1 hours | 65 |
| ReConNet | Not available | 0.16 |
| CAE | 3 minutes | 0.03 |
| CASC | 1 minute | 0.04 |

As seen from Table VI, the training time and testing time for the CASC of the present disclosure is very short compared to the conventional techniques mentioned therein.

Experiment using the University of California, Irvine (UCI) Cuffless Blood Pressure Estimation dataset: The dataset consists of Photoplethysmograph (PPG) from the fingertip, arterial blood pressure (ABP) and electrocardiogram (ECG) from channel II sampled at 125 Hz. For the experiments, the signals are divided into chunks of 512 samples which served as ground truth. The training data consisted of 75374 such samples and the testing data consisted of 13448 samples. For emulating the wireless telemonitoring scenario, these signals were projected onto a lower dimension space by Bernoulli projection matrix with 25% and 50% undersampling. These lower dimensional measurements served as the source domain (S) and the corresponding ground truth as the target domain (T). At the testing end, the signal was reconstructed from its lower dimensional representation. There are two parameters to be tuned in the CASC of the present disclosure—$\lambda$ and $\mu$. The final values used here are $\lambda=0.1$ and $\mu=1$. The transforms for the signal and the measurement domain ($T_S$ and $T_T$) are perfectly determined. The iterations were run till the objective function converged to local minima. The CASC of the present disclosure is compared with Compressive Sensing (CS) or Spectral Projected Gradient for $l_1$ minimization (SPGL1) and Stacked Sparse Denoising Autoencoder (SSDAE) that are conventionally used for reconstruction. The SPGL1 and SSDAE are optimized in the best possible manner for a fair comparison with the CASC of the present disclosure. For PPG and ABP, a 3 layered Autoencoder is used 256-128-64 which is learned greedily and Absolute Criterion is used as a Loss function. For ECG only one layer of Autoencoder is used with an Absolute Criterion for loss; this is because increasing the number of layers is detrimental to its performance. Network for SSDAE is built in Torch, a scientific computing framework available in the public domain.

TABLE VII

Results on PPG

| Undersampling Ratio | Error | SPGL1 | SSDA | CASC |
|---|---|---|---|---|
| 0.25 | Mean, ±std | 0.16, ±0.05 | 0.07, ±021 | 0.01, ±0.01 |
|  | Max | 0.35 | 0.49 | 0.16 |
|  | Min | 0.03 | 0.03 | 0.00 |
| 0.50 | Mean, ±std | 0.06, ±0.02 | 0.05, ±0.02 | 0.00, ±0.00 |
|  | Max | 0.16 | 0.49 | 0.07 |
|  | Min | 0.01 | 0.02 | 0.00 |

TABLE VIII

Results on ABP

| Undersampling Ratio | Error | SPGL1 | SSDA | CASC |
|---|---|---|---|---|
| 0.25 | Mean, ±std | 0.16, ±0.04 | 0.06, ±0.01 | 0.01, ±0.01 |
|  | Max | 0.34 | 0.19 | 0.10 |
|  | Min | 0.07 | 0.03 | 0.00 |
| 0.50 | Mean, ±std | 0.06, ±0.01 | 0.05, ±0.01 | 0.00, ±0.00 |
|  | Max | 0.14 | 0.17 | 0.05 |
|  | Min | 0.03 | 0.02 | 0.00 |

TABLE IX

Results on ECG

| Undersampling Ratio | Error | SPGL1 | SSDA | CASC |
|---|---|---|---|---|
| 0.25 | Mean, ±std | 0.17, ±0.04 | 0.43, ±0.02 | 0.05, ±0.03 |
|  | Max | 0.44 | 0.68 | 0.38 |
|  | Min | 0.10 | 0.40 | 0.00 |
| 0.50 | Mean, ±std | 0.07, ±0.01 | 0.41, ±0.02 | 0.03, ±0.01 |
|  | Max | 0.21 | 0.63 | 0.25 |
|  | Min | 0.05 | 0.38 | 0.00 |

All the experiments were run on an Intel Xeon 3.50 GHz×8 Processor, having 64 GB RAM. For SSDAE Nvidia Quadro 4000 GPU was used. Table X shows the timings in seconds. The training time is for all the samples in the training data and test time is shown per test sample to show the applicability in real-time scenarios. Since all the datasets are of the same size, the results for PPG only are shown; the timings for the other two types of signal are almost the same (SSDAE for ECG has slightly less training time since single layer was used). It may be seen that the reconstruction time for SPGL1 samples is higher than the permissible amount for real-time reconstruction. The CASC of the present disclosure and the Autoencoder based techniques are very fast and hence capable of real-time reconstruction. The CASC of the present disclosure is orders of magnitude faster compared to the Autoencoder since only three matrix-vector products are needed.

TABLE X

Training and Testing times in seconds

| Method | Training time (s) | Testing time (s)/sample |
|---|---|---|
| SPGL1 | — | 1.5 |
| SSDAE | 18360 | $4.6 \times 10^{-3}$ |
| CASC | 70 | $1.1 \times 10^{-5}$ |

Thus in accordance with the present disclosure, a couple representation learning architecture for solving inverse problems based on transform learning formulation which is an analysis equivalent of dictionary learning is provided. The formulation is referred herein above as Coupled Analysis Sparse Coding (CASC). As seen from the experimental evaluation, the performance of the CASC on various inverse problems—denoising, deblurring, super-resolution and reconstruction is better in terms of image reconstruction quality, has a very low computational complexity with a need for only three matrix-vector products, and requires very short training and testing times, which makes it applicable for real-time applications. Unlike the conventional learning architectures using inductive approaches, the CASC of the present disclosure can learn directly from the source domain. Also, the CASC of the present disclosure does not involve multiple layers of data transformation and large of parameters as seen in conventional deep learning approaches. Transform learning finds a variety of applications in computer vision and natural language processing. In vision, it has been used for synthesis problems like deblurring and super-resolution and for analysis problems like Red Green Blue (RGB) to Near Infrared (NIR) matching and photo to sketch matching. In Natural Language Processing (NLP) it has been used for multi-lingual document retrieval. It has also been used for multi-modal (text to video) retrieval. Accordingly, systems and methods of the present disclosure may be adapted for any of these applications and not limited to the exemplary vision or signal applications described herein above.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method comprising the steps of:
    identifying a source domain comprising one or more corrupted data (y) in a training set;
    identifying a target domain comprising one or more clean data (x) in the training set;
    generating a model for coupled representation learning using equal number of the one or more corrupted data and the one or more clean data, the step of generating the model comprising:
        learning a source domain transform ($T_S$) and corresponding source domain features ($Z_S$) pertaining to the source domain;
        learning a target domain transform ($T_T$) and corresponding target domain features ($Z_T$) pertaining to the target domain; and
        coupling the source domain features ($Z_S$) and the target domain features ($Z_T$) using an objective function serving as a coupling mechanism based on an analysis sparse coding formulation and characterized by a coupling operator (A) such that the source domain features ($Z_S$) are linearly mapped to the target domain features ($Z_T$), wherein the objective function being a non-convex problem is solved using an alternating minimization method by dividing the non-convex problem into a plurality of convex problems, and wherein the plurality of convex problems is solved in an alternating manner until the objective function converges to a local minima; and
    solving an inverse problem by synthesizing one or more clean data ($x_{test}$) from corresponding one or more corrupted data ($y_{test}$) from a testing set by:
        receiving the one or more corrupted data ($y_{test}$);
        obtaining source domain features ($z_S$) based on the one or more corrupted data ($y_{test}$) and the source domain transform ($T_S$);
        obtaining target domain features ($\hat{z}_T$) based on the coupling operator (A) and the source domain features ($z_S$); and
        synthesizing the one or more clean data ($x_{test}$) based on the target domain transform $T_T$ and the target domain features ($\hat{z}_T$).

2. The processor implemented method of claim 1, wherein the objective function is represented as:

$$\min_{T_M, T_S, Z_M, Z_S, A} \|T_S y - Z_S\|_F^2 + \|T_T x - Z_T\|_F^2 +$$
$$\lambda(\|T_S\|_F^2 + \|T_T\|_F^2 - \log \det T_S - \log \det T_T) +$$
$$\mu \|Z_T - A Z_S\|_F^2 + \lambda_x \|Z_T\|_1 + \lambda_y \|Z_S\|_1.$$

where y represents corrupted data in the training set stacked as columns and x represents corresponding clean data, wherein $\lambda$ and $\mu$ are parameters and $\| \|_F$ denotes the Frobenius norm.

3. The processor implemented method of claim 2, wherein the plurality of convex problems are represented as:

P1: $\min_{T_S} \|T_S y - Z_S\|_F^2 + \lambda(\|T_S\|_F^2 - \log \det T_S)$

P2: $\min_{T_T} \|T_T x - Z_T\|_F^2 + \lambda(\|T_T\|_F^2 - \log \det T_T)$

P3: $\min_{Z_S} \|T_S y - Z_S\|_F^2 + \mu \|Z_T - AZ_S\|_F^2 + \lambda_y \|Z_S\|_1$ P4: $\min_{Z_T} \|T_T x - Z_T\|_F^2 + \mu \|Z_T - AZ_S\|_F^2 + \lambda_x \|Z_T\|_1$ P5: $\min_A \|Z_T - AZ_S\|_F^2$.

4. The processor implemented method of claim 1, wherein the step of obtaining features ($z_S$) of the one or more corrupted data is represented as $z_S \leftarrow T_S y$.

5. The processor implemented method of claim 1, wherein the step of obtaining features ($\hat{z}_T$) of the one or more corrupted data is represented as $\hat{z}_T = Az_S$.

6. The processor implemented method of claim 1, wherein the step of synthesizing the one or more clean data ($x_{test}$) of the target domain is represented as pseudo inverse form $T_T x_{test} = \hat{z}_T$.

7. The processor implemented method of claim 1, wherein the number of features of the source domain is less than, more than or equal to the number of features in the target domain.

8. A system comprising:
one or more hardware processors; one or more data storage devices operatively coupled to the one or more hardware processors, wherein the one or more hardware processors configured to:
identify a source domain comprising one or more corrupted data (y) in a training set;
identify a target domain comprising one or more clean data (x) in the training set;
generate a model for coupled representation learning using equal number of the one or more corrupted data and the one or more clean data, wherein the model is generated by:
learning a source domain transform ($T_S$) and corresponding source domain features ($Z_S$) pertaining to the source domain;
learning a target domain transform ($T_T$) and corresponding target domain features ($Z_T$) pertaining to the target domain; and
coupling the source domain features ($Z_S$) and the target domain features ($Z_T$) using an objective function serving as a coupling mechanism based on an analysis sparse coding formulation and characterized by a coupling operator (A) such that the source domain features ($Z_S$) are linearly mapped to the target domain features ($Z_T$), wherein the objective function being a non-convex problem is solved using an alternating minimization method by dividing the non-convex problem into a plurality of convex problems, wherein the plurality of convex problems is solved in an alternating manner until the objective function converges to a local minima; and
solve an inverse problem by synthesizing one or more clean data ($x_{test}$) from corresponding one or more corrupted data ($y_{test}$) from a testing set by:
receiving the one or more corrupted data ($y_{test}$);
obtaining source domain features ($z_S$) based on the one or more corrupted data ($y_{test}$) and the source domain transform ($T_S$);
obtaining target domain features ($\hat{z}_T$) based on the coupling operator (A) and the source domain features ($z_S$); and
synthesizing the one or more clean data ($x_{test}$) based on the target domain transform $T_T$ and the target domain features ($\hat{z}_T$).

9. The system of claim 8, wherein the objective function is represented as:

$$\min_{T_M, T_S, Z_M, Z_S, A} \|T_S y - Z_S\|_F^2 + \|T_T x - Z_T\|_F^2 +$$
$$\lambda(\|T_S\|_F^2 + \|T_T\|_F^2 - \log \det T_S - \log \det T_T) +$$
$$\mu \|Z_T - AZ_S\|_F^2 + \lambda_x \|Z_T\|_1 + \lambda_y \|Z_S\|_1.$$

where y represents corrupted data in the training set stacked as columns and x represents corresponding clean data, wherein $\lambda$ and $\mu$ are parameters and $\|\ \|_F$ denotes the Frobenius norm.

10. The system of claim 9, wherein the plurality of convex problems are represented as:

P1: $\min_{T_S} \|T_S y - Z_S\|_F^2 + \lambda(\|T_S\|_F^2 - \log \det T_S)$

P2: $\min_{T_T} \|T_T x - Z_T\|_F^2 + \lambda(\|T_T\|_F^2 - \log \det T_T)$

P3: $\min_{Z_S} \|T_S y - Z_S\|_F^2 + \mu \|Z_T - AZ_S\|_F^2 + \lambda_y \|Z_S\|_1$ P4: $\min_{Z_T} \|T_T x - Z_T\|_F^2 + \mu \|Z_T - AZ_S\|_F^2 + \lambda_x \|Z_T\|_1$ P5: $\min_A \|Z_T - AZ_S\|_F^2$.

11. The system of claim 8, wherein obtaining features ($z_s$) of the one or more corrupted data is represented as $z_S \leftarrow T_S y$.

12. The system of claim 8, wherein obtaining features ($\hat{z}_T$) of the target domain is represented as $\hat{z}_T = Az_S$.

13. The system of claim 8, wherein synthesizing the one or more clean data ($x_{test}$) of the target domain is represented as a pseudo inverse form $T_T x_{test} = \hat{z}_T$.

14. The system of claim 8, wherein the number of features of the source domain is less than, more than or equal to the number of features in the target domain.

15. A computer program product comprising a non-transitory computer readable medium having a computer readable program embodied therein, wherein the computer readable program, when executed on a computing device, causes the computing device to:
identify a source domain comprising one or more corrupted data (y) in a training set;
identify a target domain comprising one or more clean data (x) in the training set;
generate a model for coupled representation learning using equal number of the one or more corrupted data and the one or more clean data, wherein the model is generated by:
learning a source domain transform ($T_S$) and corresponding source domain features ($Z_S$) pertaining to the source domain;
learning a target domain transform ($T_T$) and corresponding target domain features ($Z_T$) pertaining to the target domain; and
coupling the source domain features ($Z_S$) and the target domain features ($Z_T$) using an objective function serving as a coupling mechanism based on an analysis sparse coding formulation and characterized by a coupling operator (A) such that the source domain features ($Z_S$) are linearly mapped to the target domain features ($Z_T$), wherein the objective function being a non-convex problem is solved using an alternating minimization method by dividing the non-convex problem into a plurality of convex problems, wherein the plurality of convex problems is solved in an alternating manner until the objective function converges to a local minima; and solve an inverse problem by synthesizing one or more clean data ($x_{test}$) from corresponding one or more corrupted data ($y_{test}$) from a testing set by:
  receiving the one or more corrupted data ($y_{test}$);
  obtaining source domain features ($z_S$) based on the one or more corrupted data ($y_{test}$) and the source domain transform ($T_S$);
  obtaining target domain features ($\hat{z}_T$) based on the coupling operator (A) and the source domain features ($z_s$); and
  synthesizing the one or more clean data ($x_{test}$) based on the target domain transform $T_T$ and the target domain features ($\hat{z}_T$).

* * * * *